(No Model.) 2 Sheets—Sheet 1.
F. G. WILSON.
METAL BALL BEARING JOURNAL BOX FOR SHAFTS OR AXLES.
No. 564,860. Patented July 28, 1896.
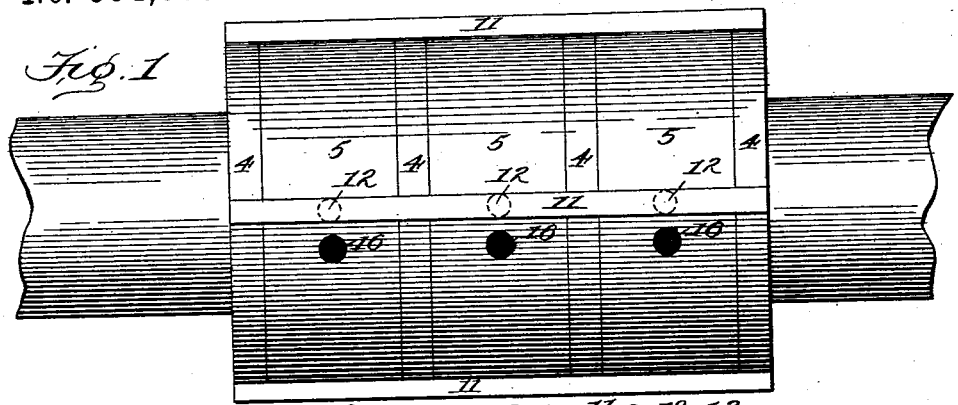
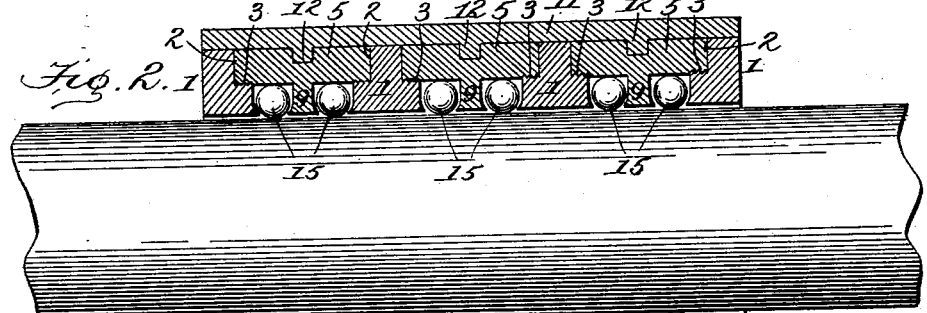
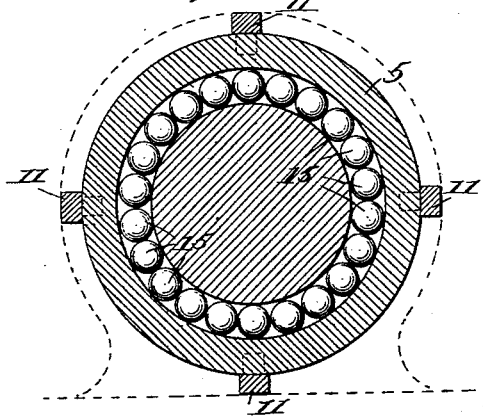
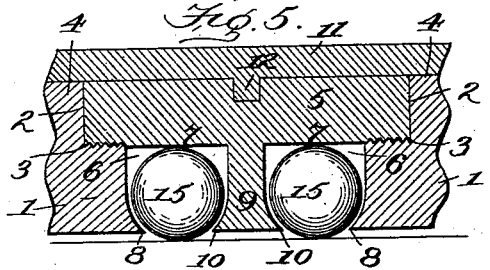
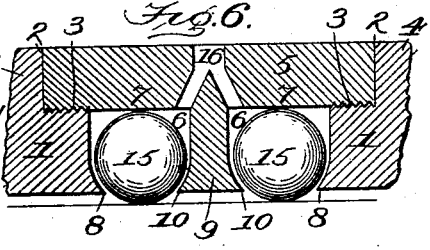
WITNESSES:
Edwin L. Bradford
Geo. M. Copenhaver
INVENTOR
Frederick G. Wilson
BY Johnson & Johnson
ATTORNEYS.
THE NORRIS PETERS CO., PHOTO-LITHO., WASHINGTON, D. C.

(No Model.) 2 Sheets—Sheet 2.

F. G. WILSON.
METAL BALL BEARING JOURNAL BOX FOR SHAFTS OR AXLES.

No. 564,860. Patented July 28, 1896.

WITNESSES:
Edwin L Bradford
Geo. M. Copenhaver

INVENTOR
Frederick G. Wilson
BY Johnson & Johnson
ATTORNEYS.

UNITED STATES PATENT OFFICE.

FREDERICK G. WILSON, OF BROOKLYN, NEW YORK.

METAL BALL-BEARING JOURNAL-BOX FOR SHAFTS OR AXLES.

SPECIFICATION forming part of Letters Patent No. 564,860, dated July 28, 1896.

Application filed April 13, 1896. Serial No. 587,372. (No model.)

*To all whom it may concern:*

Be it known that I, FREDERICK G. WILSON, a citizen of the United States, residing at Brooklyn, in the county of Kings and State of New York, have invented a new and useful Improvement in Metal Ball-Bearing Journal-Boxes for Shafts or Axles, of which the following is a specification.

My invention is directed to the production of an improved metal ball-bearing box for shafts, axles, journals, and vehicle-wheels in which the balls, arranged in circular series, constitute the bearing to reduce the friction and heat; and my improvement resides in the construction of the box of an inner and an outer series of rings in which the outer series form the bearings for the balls, while the inner series form the couplings for the outer rings and housings for the balls, making a strong and durable box, within the inner walls of which the bearing-balls are retained and roll upon the inner surfaces of the outer rings of the box and upon the shaft or journal at opposite points only so that the bearing-contact will be confined to a line drawn through the diameter of each ball.

Figure 7:
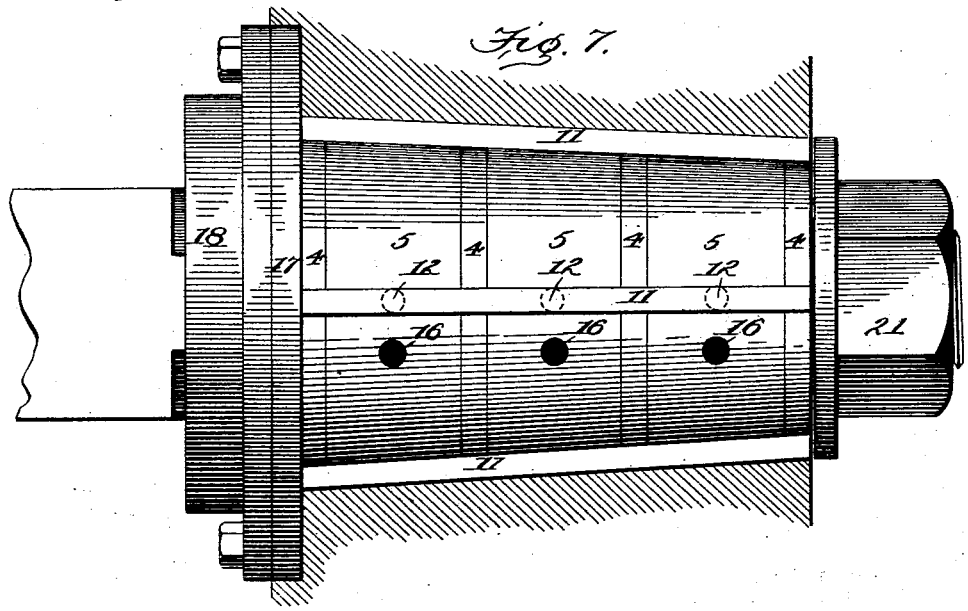
Figure 8:
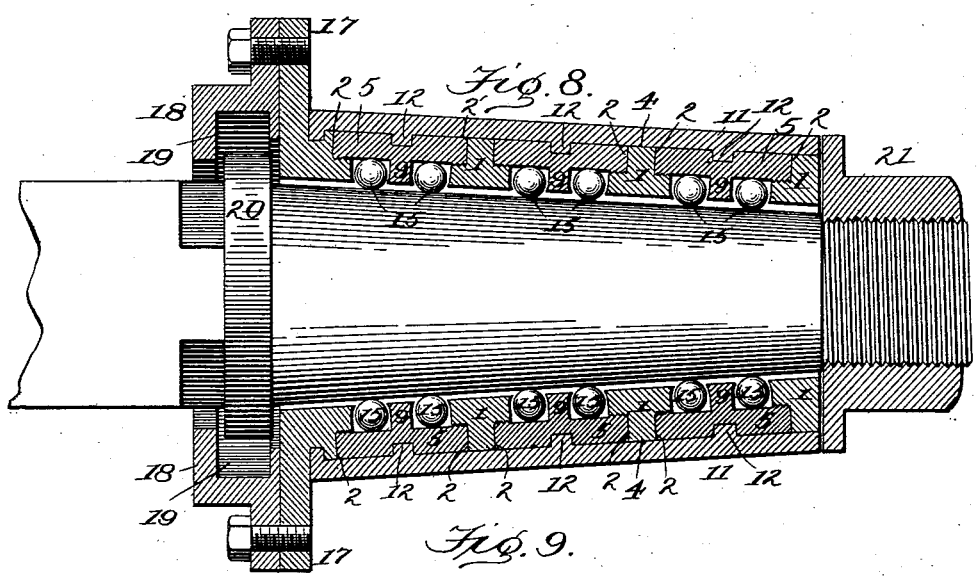
Figure 9:
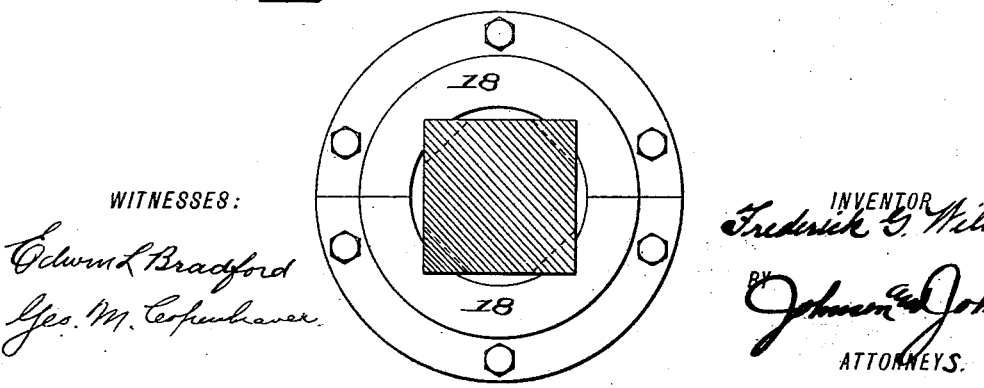

The accompanying drawings illustrate my invention, and, referring thereto, Figure 1 shows in side view my ball-bearing box for shafting. Fig. 2 is a longitudinal section of the box as applied to a shaft. Fig. 3 is a transverse section of the same. Figs. 4, 5, and 6 show in section one of the bearing-rings and the coupling-rings which form the housing for the balls. Fig. 7 shows in side view my improved ball-bearing box as applied to the hub of a wheel. Fig. 8 is a longitudinal section of the same. Fig. 9 shows the divided dust-protector for the axle-box.

The box is constructed of a series of rings, the relation and engagement of which with each other are such that the inner rings form the housing for the balls and couplings for the outer rings, which form the bearings for the balls. The inner coupling-rings 1 are each recessed about half their thickness at each edge, so as to form shoulders 2 2 at right angles to the axis of the box, and screw-threaded surfaces 3 3, parallel with the axis of the box, joining the shoulders and making the shoulder-forming part 4 about one-third the thickness of the ring between the threaded surfaces, and which, with the outer rings, constitute the outer surface of the box. The outer bearing-rings 5 are of a thickness about one-half that of the inner coupling-rings and fit within and fill the recesses of the inner coupling-rings and their shoulders. These outer bearing-rings are screw-threaded on their inner walls to engage the screw-threaded surfaces of the inner coupling-rings, so that the latter will be separated to form annular spaces 6, within which the balls are confined in a circular row. The bearing for the balls in this annular space is formed by the inner side 7 of the outer ring, and when this annular space is adapted to contain a single row of bearing-balls, as in Fig. 4, the edges of the inner rings at the inner walls thereof are lipped, preferably, by being curved toward each other, as at 8, so as to make the ball-containing space of less width at the open side of said space than at the bearing side to confine the balls between the edges of the inner coupling-rings. When the outer rings are adapted to contain a double row of bearing-balls, as in Figs. 5 and 6, an annular division 9 is formed mediately on the inner wall and, extending to the plane of the inner wall of the inner rings, terminates in lips 10, corresponding with the lips 8, and thereby form two separate housings, the lips whereof serve to retain the balls, and each ring of the outer sleeve provides a separate bearing for the double row of balls. In this way the bearings on the balls are confined to diameter-points, one of which is upon the outer rings and the other upon the shaft or axle. The balls have a limited play between the housing-walls and their retaining-lips, and the friction upon the balls is thereby reduced to a minimum as they roll around upon the ring-bearing surface by a line contact only.

To prevent the possible turning and spreading of the outer bearing-rings under the rolling action of the balls and to bind and lock the outer bearing-rings in their relation to each other and to the inner coupling-rings, I provide metal binder-bars 11, having a length equal to that of the box and lock them by pins 12, formed on the bars, engaging with recesses in the circumference of the outer bearing-rings. These binder-bars are upon the circumference of the box, and when the latter can be set in places where it can be set in lead or other metal such metal when poured about and around the box between the bars will fix them and completely cover the joints of the outer rings and form a solid base for the box to rest upon, so that it cannot turn, as shown by dotted lines, Fig. 3. This metal covering, however, may be dispensed with.

The ends of the box are closed by rings 1 1, which couple with the outer bearing-rings and coöperate therewith in forming housings for the balls. When the rings are driven home upon each other, the shoulders serve as stops or abutments to limit the exact width of the annular space within which the balls are housed and travel and are permitted to have a slight free play between the lipped walls, so that there can be no binding of the balls upon these walls.

The balls 15 are of a size to project sufficiently beyond the plane of the inner circular wall to make bearings upon which the shaft or axle turns, and I provide for lubricating the balls and the bearings by a duct 16 in the outer bearing-ring entering the annular space within which the balls are confined. When two series of bearing-balls are applied to one outer bearing-ring, the oil-duct is divided so as to deliver the oil at each side of the mediate division of the bearing-surface, as in Fig. 6.

The outer bearing-rings and the coupling-rings may be screwed together from either end of the box and the binding-bars are then applied to lock the rings together to prevent them turning.

In Figs. 7 and 8 I have shown my improved ball-bearing box as applied to the tapering journal of a wheel-hub, and when so used the binding-bars are fitted into corresponding grooves in the bore of the hub, so that the box is locked to and revolves with the wheel. In this application the inner coupling-ring at the inner end of the box has a flange 17 to which a dust-protector 18 is secured by screws, and which is formed with an annular chamber 19 for containing oiled felt and applying it to the collar 20 on the axle to exclude dust from the journal and the bearing-balls. A nut 21 on the journal secures the wheel and forms a cover for the outer end of the box. This dust-protector is made in two parts to allow it to be fitted over the axle.

It will be understood that all the parts are to be turned true and the balls and the parts that make or form contact therewith are to be hardened, but I prefer to make the bearing-rings of steel.

It will also be understood that the box can be made with one or any number of circular rows of balls so long as the bearing and coupling rings are relatively arranged and engaged to form the box-bearing and the housing for the balls.

The rings having been screwed together, one set against abutments formed by the other set, they become as fixed as if formed of a single solid wall, and the bearing of each row of balls is confined to a line on the surface of the box-bearing ring and to a line on the shaft or journal, while the slight lateral play of the balls between the lipped walls of their housings gives freedom for the balls to shift their bearing-lines slightly between said lipped bearing-walls.

While I have thus described the preferred embodiment of my invention, it will be evident to those skilled in the art that the details of construction may be varied without departing from the spirit of my invention or sacrificing any of the advantages of my improvement.

While I have stated that I prefer to make the bearing-rings of steel, yet they may be made of a suitable metal.

I claim—

1. In a ball-bearing, a box composed of an outer series of bearing-rings and an inner series of coupling-rings, each of the former having on its inner walls screw-threads and an intermediate flat surface, the inner rings, each having an external shoulder-forming part and screw-threaded on each side of said shoulder to receive and engage the outer bearing-rings, the edges of said inner coupling-rings having lips, and, in connection with the inner flat surface of the outer bearing-ring, forming an annular housing, and a circular series of balls confined therein, substantially as described.

2. In a ball-bearing, a series of outer bearing-rings each having an annular division on its inner wall and a broken flat surface on each side of said division terminating in a screw-thread, in combination with a series of inner coupling-rings each having external annular shoulder-forming parts screw-threaded on each side thereof between the said division and the inner coupling-rings, and balls confined in circular series therein, substantially as described.

3. In a ball-bearing, a box having a series of annular transverse chambers, a series of inner coupling-rings, and a series of outer rings forming the walls of said chambers, the said inner and outer rings being screwed together in abutting relation, the balls confined within said chambers and having bearing upon the outer ring parts of said annular chambers, substantially as described.

4. In a ball-bearing, a box having a series of transverse chambers, a series of inner rings, and a series of outer rings forming the walls of said chambers, balls confined in circular series within said chambers, the said inner and outer series of rings being screwed together in abutting relation, and means for locking the said series of rings together to prevent them from turning, substantially as described.

5. In a ball-bearing, a series of transverse chambers, a series of inner rings, and a series of outer rings forming the walls of said chambers, balls confined in circular series within said chambers, the said inner and outer rings being screwed together, and a series of binder-bars adapted to engage the said outer rings to lock them, substantially as described.

6. In a ball-bearing, a box having a series of transverse chambers, a series of inner rings, and a series of outer rings forming the walls of said chambers, balls confined in circular series within said chambers, the said inner and outer rings being screwed together, a series of binder-bars adapted to engage the said outer rings, and a metal covering formed between said binder-bars around the box, substantially as described.

7. In a ball-bearing, a box, a double row of balls housed side by side within parallel annular chambers, an outer ring having an annular division projecting mediately from its inner wall, and an inner ring on each side of said outer ring lapping the inner side at each end of the latter, and forming, with the annular division, the side walls of said chambers, the said inner and outer rings being secured together by screw-threads at their lapping ends, substantially as described.

FREDERICK G. WILSON.

Witnesses:
D. A. THOMPSON,
H. J. STAPLES.